United States Patent Office 3,243,675
Patented Mar. 29, 1966

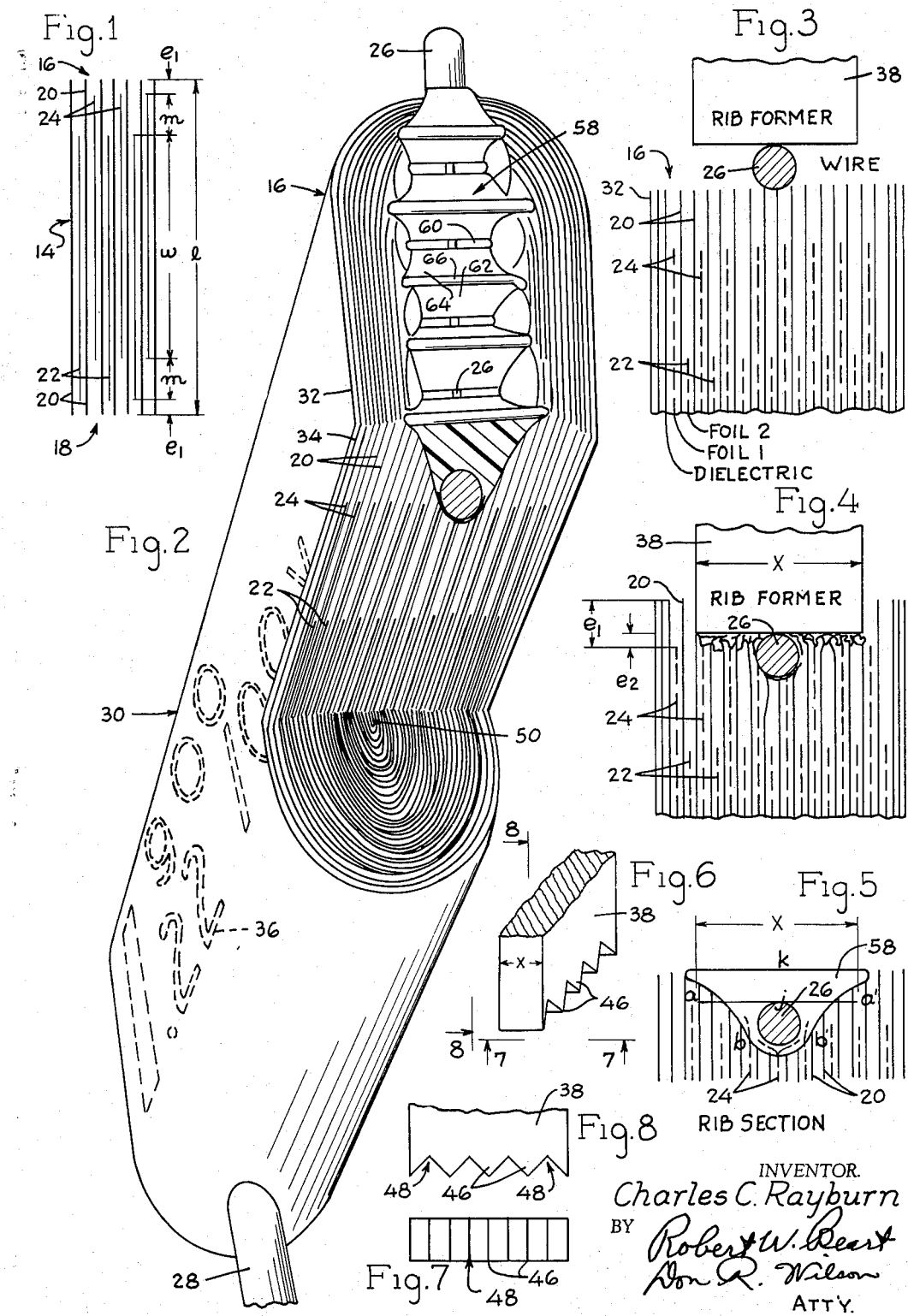

3,243,675
CAPACITOR CONSTRUCTION AND METHOD
FOR ACCOMPLISHING SAME
Charles C. Rayburn, Falls Church, Va., assignor to Illinois
Tool Works Inc., Chicago, Ill., a corporation of Delaware
Original application Feb. 14, 1963, Ser. No. 258,574.
Divided and this application Aug. 2, 1965, Ser. No. 476,291
15 Claims. (Cl. 317—260)

This application is a division of application Serial No. 258,574, filed February 14, 1963.

This invention relates in general to convolutely rolled capacitors and the method and apparatus for constructing same and more particularly relates to convolutely rolled electrode foils and plastic dielectric films and the attachment of leads thereto.

This invention is an improvement of my patent application entitled "Wound Capacitor," filed October 25, 1961, having Serial No. 147,646, now issued as U.S. 3,134,059, and is an improvement to and compatible with co-pending application Serial No. 102,753, filed April 13, 1961, entitled "Method and Apparatus for Articles of Manufacture," now issued as U.S. 3,117,364, assigned to the same assignee, and of which I am one of the joint inventors, which latter application shows a method and apparatus for automatically assembling leads to the capacitor constructions in the first mentioned application. Both of these applications are specifically incorporated by reference into the instant application.

Wound capacitors are normally fabricated from strips or tapes of conductive material such as a metal or a conductive coated dielectric wound into a tight coil. In winding the capacitor coil, two or more conductive tapes are wound together with dielectric material between the conductive tapes to insulate them from each other. In forming the capacitor coil, the conductive tapes are staggered so that the edge of one tape extends beyond one edge of the other tape, while the opposite edge of the other tape extends beyond the corresponding edge of the first. Thus, normally in winding the condenser or capacitor coil, two conductive tapes are wound in the staggered arrangement with the intermediate dielectric material positioned only between the overlapping portions of the two tapes. The wound capacitor coil thus has the extending edges of each of the conductive tapes forming a different end of the coil. One lead wire is then conventionally soldered at each end of the coil to portions of the extending edge of the corresponding conductive tape.

While wound capacitors, fabricated from plastic or paper dielectric materials, are, in many respects satisfactory, they also have certain disadvantages. For example, it is quite conventional to wind capacitors as above set forth with the conductive tapes being formed of thin tin foil so that a good solder bond may be made with lead wires which are coated with tin so that a good low resistance electrical connection can be made. There are two major disadvantages to this conventional construction, namely, tin foil is relatively expensive as compared to other material, such as for example, aluminum foil, thus greatly increasing the cost of manufacture of the product and secondly, the solder junction of the lead and the thin tin foil has little inherent mechanical strength, so that when the leads are soldered to the edges of the foil tapes, extreme care must be exercised in the use of the capacitor to prevent tearing away of the leads from the capacitor.

Aluminum foils have been attempted for replacing the tin foils in a wound capacitor but the difficulties in obtaining a good connection of the lead wires to the aluminum foils has prevented wide spread use of this more economical foil material. It should be noted at this juncture that it is preferable that the lead wires be of conventional materials such as tin coated copper or steel materials which are easily soldered to other circuits. Thus, the expedient of using aluminum wire leads with aluminum foils does not present an acceptable construction for the capacitor markets.

In the aforenoted applications, I show a method and apparatus for providing an improved capacitor construction wherein the leads are disposed transversely to the capacitor coil and are locked into engagement with the foils by a heated and then fused portion of the dielectric materials. The concepts involved in these aforementioned patent applications afforded a number of advantages, among which was an increased lead pull-out strength substantially greater than the conventionally soldered constructions. The above-mentioned applications also taught a capacitor construction where the dielectric film was (a) wider than the furthest extensions of the two opposite ends of the electrode foils; (b) where the width of the dielectric film was equal or flush with the extensions of the opposite ends of the electrode foils; and (c) where the foils extended beyond the side edges of the dielectric material as in conventional construction. The range of pull-out strength obtainable with the above described constructions was on the order of two to four pounds, which was relatively high as compared to conventionally soldered joints. The constructions set forth in the aforenoted applications were quite efficacious for use with tin foil as the electrode foils. However, only moderate results were obtained with aluminum foils as the electrode foils. For example, while some of the capacitor constructions utilizing the techniques of the above-mentioned applications would produce good capacitors, there was difficulty in obtaining a uniform high rate high quality production both from a mechanical and an electrical standpoint.

The instant invention is directed towards the concepts of solving the problems of uniformly obtaining a high quality product wherein the electrode foils and the lead wires are of different materials and doing this in an economical, commercially feasible manner.

More particularly, it is an object of this invention to provide an improved convolutely rolled capacitor construction having electrode foils and dielectric means of thermoplastic material, the lead means being disposed transversely of the end surfaces of the coils and locked to the construction to provide a superior product.

It is a further object of this invention to provide a capacitor construction as above identified wherein the attachment of the leads to the ends of the coils is done in a novel manner to provide a construction to provide substantially increased lead strength which is more resistant to mechanical pull-out or strip out than heretofore known constructions.

Still another object of this invention is to provide a capacitor construction as above identified wherein there is a uniform contact of the lead with all convolutions of the electrode foils.

Still another object of this invention is to provide a capacitor construction of the aforenoted type which affords a more economical construction while obtaining a high reliability and is particularly well adapted for assembling tinned copper leads or similar conventional leads to aluminum foil electrodes of a capacitor, the construction also being well adapted for use where any dissimilar metal foil and metal construction is utilized.

Still another object of this invention is to provide a capacitor construction with increased reliability and performance in that shunting of the various foils is eliminated to make all of the turns of the capacitor coil noninductive.

A further object of this invention is to provide a capacitor construction which has an exceedingly low ohmic contact between the lead wire and the capacitor foil where the lead wire is made of conventional lead wire materials and the foils are made with aluminum.

A still further object of this invention is to provide a capacitor construction which is economical to produce in that it utilizes cheaper materials, provides for a minimum rejection rate, and due to the inherent characteristics of the capacitor to lead assembly construction, is very rapid to assemble.

It is a further object of this invention to provide a reliable method of producing high quality, high reliability capacitors at a high production rate.

More particularly, it is an object of this invention to provide a method of attaching leads to a particular capacitor construction to provide good control of the spacing of the leads, which provides good thermal coupling of the individual lead to the electrode foils to prevent excessive heating of the leads during the assembly operation, and further boils out plastic at the exact junctions of the leads and the individual coils of foil to afford exceptionally good foil to lead contact at a relatively high speed whereby a high production rate may be maintained with a very low rejection rate.

It is a further object of this invention to provide a method of assembling leads to capacitors wherein the amount of marginal extent of the dielectric relative to the edge surfaces of the electrode foils may be precalculated by a formula to provide for optimum results.

It is still another object of this invention to provide a process wherein the lead attachment is in a sense self-controlling due to thermal and mechanical relationships which keep the dielectric plastic from burning during the assembly of the lead wires to thereby minimize the degradation of the mechanical strength of the bonding of the leads to the foils and prevents the apparatus from becoming gummed up from overheated plastic material.

It is still another object of this invention to provide a capacitor construction which is well adapted to impregnation of the ends of the capacitor for moisture proofing without the necessity of coating the entire capacitor body.

Still another object of this invention is to provide a capacitor construction utilizing dielectric plastic materials which are essentially clear transparent plastic which are assembled with a thermoplastic insert wrap interposed between the last wraps of the dielectric to give identifying colors and markings to the capacitor to thereby eliminate printing and marking of the unit after it is assembled.

It is still another object of this invention to provide a capacitor construction wherein the contacting of the foils to the lead wire is characterized as being surrounded by fused thermoplastic material which insulates the junction as well as the entire lead wire to thereby afford an electrolytic type of construction utilizing an aluminum foil electrode, an electrolyte and a lead wire of a dissimilar material.

A still further object of this invention is to provide a capacitor construction wherein tactile identification may be conveniently imparted to opposite ends of the capacitor for orientation purposes.

A still further object of this invention is to provide a construction wherein melted plastic is controllably flowed over the lead wire during the assembly of the lead to the end of the capacitor so as to form strong ribs of fused plastic material which extends substantially transversely to the axis of the lead wire.

A still further object of this invention is to provide a method and apparatus wherein a rib forming means is utilized during the assembly of a hot lead wire to the end of a plastic dielectric capacitor coil to impart a plurality of strong plastic ribs to the construction to firmly bond the lead wire to the capacitor coil.

It is still another object of this invention to provide a capacitor construction method which will accommodate a wide range of dimensional tolerances, is relatively insensitive to position of the parts, affords an extremely short assembly time for assembling leads to the capacitor end, is completely compatible with automatic techniques and is otherwise well adapted for the purposes for which it was designed.

Still another object of this invention is to provide a rib former for forming plastic ribs on the end of a capacitor which is preferably formed of high electrical resistivity material and which has low thermal conductivity.

Still another object of this invention is to provide a rib former, as above characterized, which has a plurality of substantially regularly spaced teeth for engaging the lead wire during the assembly thereof to apply equal pressure to the lead wire during the insertion thereof, is relatively easy to make by conventional tooling techniques and is otherwise well adapted for the purposes for which it was designed.

Still another object of this invention is to provide a rib former construction wherein the teeth on the rib former preferably have a form such that the spaces between adjacent teeth have substantially the same volume as do the teeth themselves.

Still another object of this invention is to provide a method, apparatus and capacitor construction which may be utilized over a wide range of capacitor values and different sizes of capacitors, the method and the apparatus as well as the constructions per se being exceedingly compatible with very few numbers of dielectric foil widths and thicknesses to thereby reduce the stocking and inventory problems during manufacture.

The novel features that are characteristic of the invention are set forth with particularity in the appended claims. The invention itself, both as to its organization and its method of operation, together with additional objects and advantages thereof, will best be understood by the following description of specific embodiments when read in connection with the accompanying drawings in which:

FIG. 1 is a semidiagrammatic view of an axial section through the long dimension of a convolutely wound capacitor construction;

FIG. 2 is an enlarged, perspective view, partially in section, showing a capacitor constructed according to the concepts of the instant invention;

FIG. 3 is a semidiagrammatic sectional view showing the assembly of a lead wire to a capacitor end, the view being shown just prior to the forcing of the hot lead wire into the capacitor end;

FIG. 4 is a view similar to FIG. 3 showing the second step in the assembly;

FIG. 5 is a view similar to FIGS. 3 and 4 after the rib former has been removed;

FIG. 6 is a semidiagrammatic perspective view of a rib former;

FIG. 7 is a view along lines 7—7 of FIG. 6;

FIG. 8 is a view along lines 8—8 of FIG. 6;

Figure 9:
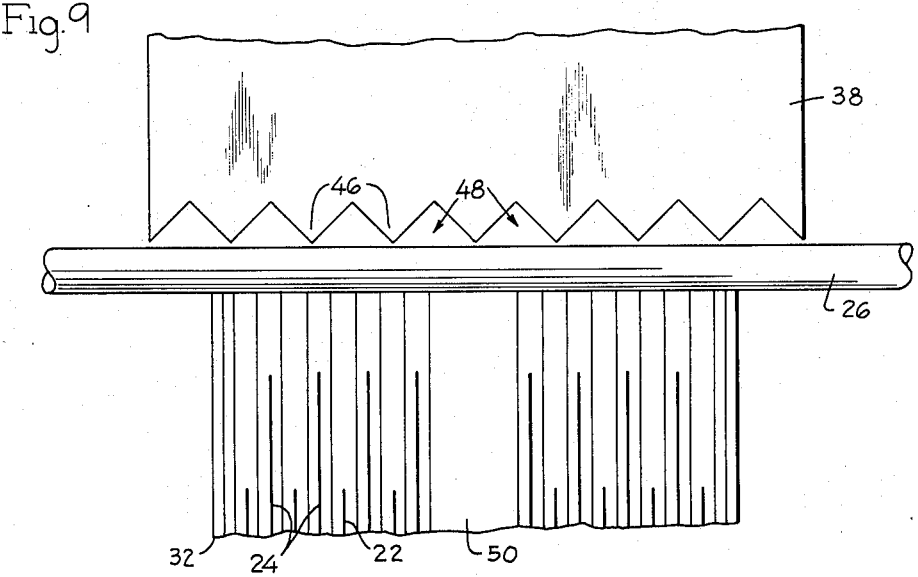
FIG. 9 is a view similar to FIG. 3 taken at right angles to the view of FIG. 3.
Figure 10:
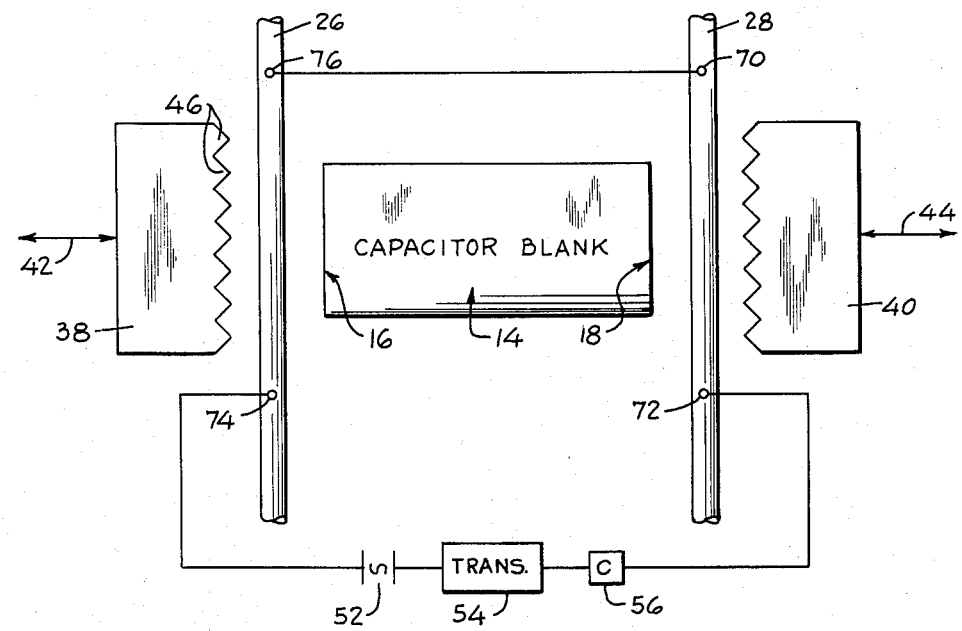
FIG. 10 is a semidiagrammatic view of the apparatus for assembling the leads just prior to the assembly operation shown in FIG. 9.

A capacitor blank 14 is shown in semidiagrammatic outline form in FIG. 10 having opposite end surfaces 16 and 18. An axial sectional view of this capacitor blank 14 is shown in FIG. 1 and comprises convolutely wound electrode foils 22 and 24 which are separated by a plastic dielectric film means 20. In practice, two identical films 20 are used to separate the two foils 22 and 24. Elongated electrode contact means 26 and 28 are adapted to be heated electrically by a short heavy duration electrical current while being forced inwardly, i.e., towards each other to become the lead wires for the capacitors. The techniques for automatically accomplishing this are set forth in detail and with particularity in my co-pending application of which I am a co-inventor aforementioned. In winding the capacitor blanks 14, to produce the finished product 30 shown in FIG. 2, it is preferable to wind an over-wrap layer or layers of plastic foil 32 to provide mechanical and moisture protection to the generally cylindrical coil. It is also advantageous to flatten the coil as originally wound to provide somewhat of an oblated cylinder as indicated in FIG. 2 to thereby substantially reduce the area of empty space in the center of the capacitor as indicated at 50. In commercial practice, a number of double over-wraps varying from 2 to 12 may be used depending upon the design requirements of the capacitor. The instant construction includes the concept of using an insert 34 adjacent the last outer-wrap 32, said insert 34 being essentially of the same width as the plastic dielectric 20 and the over-wraps extension thereof. The insert 34 is preferably colored and is preprinted, and since the plastic dielectric is preferably clear, this provides a convenient automatic way of identifying the characteristics of the capacitor. This will be discussed in more detail hereinafter.

As aforediscussed, the elongated lead wires 26 and 28 are assembled to the end of the capacitor blanks by passing a short duration, high amperage current through the lead wires while moving them toward the end of the capacitor. This heats up the lead wires to in turn cause the plastic dielectric to melt allowing the lead wires to embed themselves in contact with the foils adjacent the respective ends. As shown in FIG. 10, there are preferably two rib former members 38 and 40 which are actuated by means 42 and 44 as shown semidiagrammatically by arrows which engage the lead wires 26 and 28 while the lead wires are being heated. The rib formers 38 and 40 preferably have teeth 46 thereon having spaces between teeth 48 which cause the plastic dielectric to flow into a rib-like shape 58 shown in FIG. 2. The electrical current is supplied to the lead wires from a suitable source 52 which goes through a transformer 54 and a control means 56 which may be of the varieties set forth in the co-pending application aforementioned. The rib formers 38 and 40 serve several functions which shall be explained in detail hereinafter.

A plurality of rib-like structures 58 is formed on the capacitor end which is made basically of clear, heated and then cooled plastic which was originally the extension of the dielectric which was heated up and molded by the hot lead wires and the cooperation of the rib former during the assembly thereof. The individual ribs 58 are somewhat triangular in shape conforming to the configuration of the spaces 48 between teeth 46 on the rib former, the tops 60 of the individual ribs corresponding to the valleys between adjacent teeth. The two sides 62 and 64 of the ribs are formed by the sides of the teeth 46, whereas the valleys between the ribs (60) are formed by the extreme tips of the teeth. A small portion of the lead wire 26 is exposed in the valleys 60 as shown in FIG. 2 where the rib former 38 engages the wire.

There are several interrelated features in the instant inventive concepts which shall now be described. In FIG. 1 various dimensional relationships along a section of the length of a capacitor are shown. More particularly, $l$ equals the overall length; $w$ equals the active width of the electrical field; $m$ equals the margin; and $e_1$ equals the dielectric extension wherein the plastic material 20 extends axially beyond the furthermost edge surface of the adjacent foil. It will be noted, from FIG. 1, that $l=2e_1+2m+w$ or $l=2e_1+m+(m+w)$ where $m+w$ is the foil width. For a given foil width and dielectric width, $2e_1+m=$ a constant.

I have ascertained a range of values for $e_1$ and $m$ which shall now be explained. The value of $m$ is determined by the location of the lead wire such as 26 relative to the ends of the foils, for example, foil 24. For example, if the lead wire were to be buried one-half a wire diameter into $m$, the remaining portion of $m$ must be made up and determined by the electrical characteristics of the capacitor. In low voltage capacitors, assuming a constant position of the lead wire, $m$ may be decreased and in high voltage capacitors $m$ would have to be increased.

The determination of the dimension $e_1$ is of importance. As shown in FIG. 4, $e_1$ is the initial dielectric extension and $e_2$ is the compressed dielectric extension. I have ascertained that for optimum results, the wire should penetrate into the margin $m$ about one-half diameter. This assures contact with every turn of the foils 24 thereby making the capacitor noninductive. (This is on the assumption that the percentage of weave and stray of the winding machine used to initially wind the capacitor will be well within the tolerance as determined by the dimension of one-half a wire diameter.)

It should be noted that if the dimension $e_2$ (see FIG. 4) is greater than one wire diameter, the wire would not contact the edge surfaces of the foils such as 24. Thus, it is important that the dimension $e_2$ should never exceed the wire diameter. This assures that the rib former teeth will keep even pressure on the wire 24 during the cooling of the heated plastic material to thereby keep the molten dielectric excluded from the lead wire-aluminum foil contact, thereby assuming a low ohmic contact.

Still another reason for making the dimension $e_2$ in the neighborhood of one-half a wire diameter is to provide a thermal coupling to the lead wires 26 and 28 which accelerates cooling when power is removed by interrupting the circuit to the source 52 in FIG. 10. After power is removed from the electrode wires or leads 26–28, each part, i.e., the capacitor foils, the dielectric material, the lead wires per se and the rib former carries heat from the process thereby preventing excessive heating of the lead assembly contact electrodes. If the lead assembler contacts, shown diagrammatically at 70, 72, 74 and 76, get hot, their resistance increases. (It should be noted that the lead assembler electrode contacts are shown in detail in the aforementioned patent application of which I am one of the joint inventors.) With an increased resistance, the assembler electrode contacts start dissipating $I^2R$ power which produces more heat and the entire process goes out of control.

Another natural advantage of the thermal coupling aspects which occurs is the abrupt rate change of lead penetration during assembly as shall now be explained. When power is supplied from the source 52, through the transformer 54 and a control means 56 to the circuit shown in FIG. 10, those portions of the lead wires between the assembler electrodes 70, 72, 74 and 76 heat up due to their internal resistance. This heat is sufficient to melt the dielectric material. As the wires progress inwardly, they contact the coils of foil which provides a thermal coupling which will start cooling the leads. This engagement with the foils causes, in addition to mechanical opposition, a thermal change in the electrode wire being heated, both of which give a measure of control to the capacitor margin and the spacing between the leads. The control 56 may be made responsive to the resistance change in the electrode wires so that power supplied to the electrodes may be shut off. This makes the process work dependent rather than time dependent.

A further aspect of the electrodes wires 26–28 engaging the end of the foils is that it provides an electrical shunt through the aluminum foil which reduces the power dissipation rate of the wire momentarily since the current is divided between the lead wire and the aluminum foil. This also contributes to making a natural obstacle to stop the lead penetration and also assures the "boiling out" of the plastic dielectric material at the exact junctions or joints between the ends of the foil 24 and the lead wire 26.

Another advantage of this construction is that it prevents the lead wire 24 from continuing to rise in temperature until the molten dielectric in the immediate vicinity of the lead is burned. Stated another way, the thermal coupling and electrical characteristics that obtain by shunting the current supplied to the lead wire during the assembly process prevents the lead from continuing to rise in temperature until the molten dielectric would start to char. If the dielectric were to start burning or charring, the lead strength would be substantially diminished. Also, the resin, or molten dielectric, would start sticking to the rib former teeth tips which are in direct contact with the leads. This sticking action causes the process to degenerate rapidly until the rib former would fuse to the end of the capacitor.

The instant construction described greatly increases the pull-out lead strength. A range of values of 9 to 15 pounds is readily obtained by this process. This compares to a 2–4 pound range in the constructions set forth in my co-pending applications aforementioned which were large increases over solder joints. For test purposes the leads are pulled along the line parallel to the axis of the capacitor. The result is to peel the electrode wire such as 26 from the capacitor. Ultimately, the first rib nearest the point of lead egress determines the lead strength, since in failure, the ribs are broken sequentially. Small capacitors and medium sized capacitors have essentially the same lead strength assuming that the same size of rib former is used on both since the strength is dependent on the first rib. The wire 26 may be pulled out by breaking the rib bond along line $a$—$b$ of FIG. 5 where the molten resin is fused to the unheated dielectric extension. Another type of failure is to break the rib along lines $j$—$k$ essentially a failure through the formed triangular resin shaped rib 58 itself. The amount of resin or fused plastic dielectric available to form the rib 58 is determined by the dielectric extension $e_1$ as shown in FIG. 3 and the fraction of the extension region occupied by dielectric as compared to air.

It follows that the triangular ribs 58 would be strongest if the dielectric 20 were thick compared to the thickness of the foils 22 and 24, the latter, i.e., foils, determining the air space in the extension area $e_1$. It might at first blush appear that the extension $e_1$ should be about two wire diameters or more in size, but with long extensions $e_1$, the cool rib former 38 compresses the dielectric against the aluminum foil ends 24 and no force is applied to the freely floating hot wire 26. For reasons previously listed, the dielectric extensions $e_1$ in FIG. 4 when compressed to $e_2$, must not be more than one wire diameter and preferably about one-half wire diameter.

The values of $e_1$ may be determined from the expression $$e_1 = e_2 \frac{f+d}{d}$$

where $f$ is the foil thickness and $d$ is the dielectric thickness. In practice there is some column failure of the foils 24 and the wire will embed approximately one-half diameter with a compressed extension $e_2$ equaling .027 inch using No. 20 AWG wire. Values of $e_1$ may be determined from the formula above set forth; as examples, the following table is shown:

| $f$ (foil thickness), inches | $d$ (dielectric thickness), inches | $e_1$ (dielectric extension), inches |
|---|---|---|
| .00025 | .00025 | .054 |
| .00025 | .00050 | .041 |
| .00025 | .00075 | .036 |

As just shown, $e_1$ must be diminished for thicker dielectrics. As previously discussed, $2e_1+m=$ a constant, Thus, $m$ must be increased for thicker dielectrics which is also a requirement for higher voltage ratings. The magnitude of this change is also correct. The net effect of this consequence is to minimize the number of material widths which must be stocked by the manufacturer without sacrificing material by making some margins greater than they need be electrically.

A second natural advantage results from the fact that very large capacitors need greater lead strength than small and medium sized capacitors and also require leads of greater diameter. But the leads of greater diameter allow a greater dielectric extension in its compressed or $e_2$ dimension. With a greater $e_2$ dimension, lines $a$—$b$ of FIG. 5 is longer and more resin is available to allow section $j$—$k$ of FIG. 5 to be formed to a greater thickness. Thus, large capacitors, requiring larger diameter leads, have longer dielectric extensions which give rise to greater lead strength. As previously noted, longer extensions with smaller leads will not satisfy the exacting requirements of thermal and electrical contact during the assembly process.

The rib former 38 is shaped to form the resin ribs 58 as the hot molten plastic is displaced by the hot wire. The former 38 is preferably in the neighborhood of four wire diameters in breadth to make the process insensitive to accurate location of the rib former with respect to the lead wire. Its length is preferably equal to or greater than the length of the lead contact with the capacitor. It will be appreciated that the number and shapes of the teeth may be varied and the formers 38 and 40 may differ to provide identification of polarity of the capacitor. As shown in FIG. 5, the dimension $x$ is equal to the breadth of the rib former, and any resin excess which escapes to a point about $a$ (the left hand marginal extent of the rib former 38 as shown by the dimension $x$) does not bond to the unmelted dielectric ends. This excess does not contribute to further lead strength.

The formed ribs 58 take the shape complementary to the shape of the teeth 46. The rib formers 38 and 40 may be made with regular teeth and as aforediscussed may be the same or different. One form that has been found to work well is a 1/16 inch pitch cut with a 90° cutter. This shape has equal volume in the area 48 occupied between the teeth as compared to the volume of the teeth themselves. The teeth may be cut in straight or curved lines to vary the teeth to space ratio in either direction. Additional lead strengths can be gained by forming the rib former to make section $j$—$k$ of FIG. 5 greater until it is twice as strong as the bond $a$—$b$ in FIG. 5. At this strength, the rib may tear on either side of the bonded junction along line $a$—$b$ and a corresponding line $a'$—$b'$ on the other side or through the center section $j$—$k$. Any further strengthening or placing of more material in the area $j$—$k$ would be useless.

The rib former, as aforementioned, is preferably made of a high resistivity low thermal conductivity material. Stainless steel has been found efficacious for this purpose and it has a resisitvity approximately 40 times the resistivity of copper. This resistivity allows the rib former to apply pressure to the lead wire during assembly without shunting the current through the rib former. The relatively lower thermal conductivity prevents the rib former from extracting too much heat from the lead as the lead temperature is rapidly elevated as the curent is passed therethrough. The entire heating and freezing process may be accomplished in a very short cycle on the order of one-half second or less.

As can be seen in FIG. 5, the fused plastic dielectric section extends completely around the wire 26 so that the junction between the wire and the ends of the foils 24 in contact therewith are completely sealed in fused plastic. Since the tinned copper wire 26, and the aluminum foil 24 are joined in a seal of dielectric material, this lead attachment system may be employed for electrolytic construction. It will be realized that while aluminum foils and tinned copper wire are being discussed, other dissimilar lead wires and foil constructions are contemplated. The molten dielectric bonds the layers of aluminum foil 24 and the lead together in the vicinity of the lead wire, thereby protecting the joint on all sides from the electrolyte. The construction shown in FIGS. 1 through 5 would be varied in an electrolytic construction by having a suitable filler material for retaining a suitable electrolyte. The electrolyte would be a liquid for use with aluminum and the filler would be a fibrous material such as, for example, paper or the like. The thermoplastic dielectric film 20 would serve four purposes in the electrolytic capacitor construction. The first purpose would be to provide the structural material which gives lead strength to the lead attachment. The second function would be to provide a self seal which protects the pressure joints of the two dissimilar metals against chemical action of the electrolyte. A futher purpose is to provide a self case to protect the unit mechanically and to protect against electrolyte loss through the wall. A fourth purpose of the dielectric material would be that after impregnating the capacitor with electrolyte with suitable vacuum techniques as well understood, the ends 16 and 18 may be sealed with heat to prevent escapement of the electrolyte. Although several thermoplastic films 20 may be used for the electrolytic construction, it is preferable to use one that has both heat sealing characteristics and one that will stand up well to the particular dielectric liquid material being used.

As aforediscussed, it is advantageous with the instant capacitor to use an inserted wrap labeling technique by inserting a short wrap 34 intermediate the outer layers of over-wrap of plastic dielectric of the capacitor during winding. Since winding is generally done on automatic machinery which will easily accommodate the insertion of an extra wrap of material, and since the ends of the capacitor may be readily sealed by heat or impregnation without necessitating an entire coating over the body of the capacitor, the instant capacitor is particularly well adapted for use with a thermoplastic label insert. Since printing individual capacitor units after they have been made is an expensive and troublesome process due to the irregular size of the assembly, the use of a thermoplastic label insert which is inserted into the final wraps of the dielectric which form the case is particularly advantageous. Most thermoplastic films usable for a dielectric in capacitors, such as for example, those sold under the trade name "Mylar" are transparent, said characteristic allowing the label which is a few layers down in the thermoplastic to be readily viewed. The printed insert is inserted after the foil termination and during the over-wrapping process during the winding. The insert is short enough not to enter into the thermal cut-off and sealing of the dielectric to the body of the capacitor on the very last wrap. The insert is preferably the length of at least one turn and shows the capacitor identification through the transparent dielectric. It is easily obtainable in colored materials to give the capacitor case color, and preferably extends exactly the length of the cylindrical capacitor form. If a thermoplastic insert is used, which is preferable, the leads will easily assemble through it as through the other dielectric film.

One consideration used in determining the number of outer-wraps and hence the total amount of material needed in this plastic film to be applied to a capacitor case is the amount of moisture protection required in the capacitor. Also balanced into this consideration are the various characteristics of the dielectric material and the cost thereof. By choosing a particular thermoplastic film insert such as, for example, a film such as "Tedlar" manufactured by the Du Pont Company, the insert film for the label may have greater moisture protection than that generally used for the dielectric material such for example, "Mylar." This permits a reduction in the amount of dielectric over-wraps required to obtain good moisture protection in the outer portions of the casing.

Although specific embodiments of the invention have been shown and described, it is with full awareness that many modifications thereof are posible. The invention, therefore, is not to be restricted insofar as is necessitated by the prior art and by the spirit of the appended claims.

I claim:

1. A convolutely rolled capacitor comprising electrode foil means and thermosplastic dielectric means wound in a coil to provide spaced end surfaces, lead means embedded in at least one end surface and in electrical contact with said electrode foil means, said end surface being characterized as having at least one rib of fused dielectric material extending substantially transversely to the axis of the coil in bonded engagement with said lead wire and said plastic dielectric to provide a strong mechanical attachment of the lead wire to the end of the capacitor.

2. A convolutely wound capacitor comprising thermoplastic tape means of predetermined width, electrode foil means separated by said thermoplastic tape means and no part of which extends beyond the edge surface of said plastic film means, said thermoplastic film and electrode foil means being convolutely wound into a coil having spaced end surfaces, and electrical lead means associated with at least one of said end surfaces, said electrical lead means traversing said one end surface and held in physical contact with said electrode foil means by a melted and then cooled portion of the edge portion of at least one of said plastic films, at least a portion of the melted and then cooled portions of the plastic film means being formed in a rib shape which extends transversely to the axis of said coil.

3. The capacitor set forth in claim 2 wherein the electrode foil means is in the form of aluminum foil and the electrical lead means of a material which is not readily solderable to aluminum foil, said melted and then cooled portion of the edge portion of said plastic film means forming a bonded junction between said lead means and said aluminum foil means by holding the aluminum foil means and the lead means in electrical and mechanical engagement with each other.

4. The construction set forth in claim 2 wherein there are a plurality of substantially regularly spaced ribs of fused plastic material disposed substantially transversely to the axis of said electrical lead means.

5. A convolutely wound capacitor comprising first and second thermoplastic films having dielectric characteristics, first and second electrode foil means interposed intermediate said first and second films, said films and first and second electrode foil means being convolutely wound into a generally cylindrical form having spaced substantially parallel end surfaces, said first and second electrode foil means being wound in a staggered arrangement so that one edge surface of each foil means extends beyond the opposite edge of the other foil means, said first and second electrode foil means when in staggered array having an overall width dimension as measured from the furthest extremities thereof less than the width of the plastic films whereby said ends on the capacitor coil are the edge surfaces of said thermoplastic films, and electrical lead means associated with each of said end surfaces, each said electrical lead means being substantially straight and disposed substantially transversely to the axis of said cylindrical form, said electrical lead means being held in physical and electrical contact with said electrode foil means by portions of said thermoplastic films fused together at least in part configured into a rib shaped form which extends across said lead means substantially transversely to the axis of said electrode lead means.

6. The capacitor set forth in claim 5 wherein said lead means is in the form of a substantially straight substantially constant and predetermined diameter wire, said thermoplastic material extending on each end beyond the furthest extent of the corresponding electrode foil means a predetermined dimension $e_1$ as determined by the formula $$e_1 = e_2 \frac{f+d}{d}$$

where $f$ is the foil thickness and $d$ is the thermoplastic dielectric thickness, and $e_2$ is in the range of .01 to 1 predetermined wire diameter.

7. The construction set forth in claim 6 wherein $e_2$ is in the range of .50 to 1 predetermined wire diameter.

8. The construction set forth in claim 5 wherein said rib form is characterized as having a top surface spaced axially outwardly of the coil from the furthest axially extending portion of said lead means, said top surface merging with oppositely disposed side surfaces which extend axially inwardly of the coil to intersect with said lead means at spaced points.

9. The construction set forth in claim 8 wherein said side surfaces are oppositely diverging and the rib form has a shape similar to a rack tooth.

10. The construction set forth in claim 9 wherein there are a plurality of rib forms substantially identical in shape in spaced array traversing the end surface of the coil along said lead means.

11. The construction set forth in claim 10 wherein the rib forms on each end differ to provide tactile identification to the capacitor ends.

12. The construction set forth in claim 5 wherein one of said thermoplastic films constitutes an outer wrap around the coil, and a label is interposed under the outermost layer of said thermoplastic film wound onto said coil.

13. The construction set forth in claim 5 wherein the junctions between the foil means and said lead means are characterized as being completely sealed in fused plastic, whereby an electrolyte may be disposed within said coil.

14. The method of fabricating a capacitor comprising convolute winding of strips of conductive material separated from each other by thermoplastic dielectric material to form a coil, said strips of conductive material being in staggered arrangement and the edges of said dielectric material being the ends of said coil, placing an electrical lead means against one end of said coil, heating said lead means and said dielectric material to melt a portion of said dielectric material, embedding said lead means into contact with one of said strips of conductive material, displacing melted dielectric material to form a rib over said lead means, and cooling said dielectric material to lock said lead means within said coil.

15. The method of fabricating a capacitor comprising convolute winding of strips of conductive material separated from each other by thermoplastic dielectric material to form a coil, said strips of conductive material being in staggered arrangement and the edges of said dielectric material being the ends of said coil, placing a heated electrical lead means against one end of said coil to melt said dielectric material, forcing said heated lead means into said one end of said coil and into contact with one of said strips of conductive material, and displacing melted dielectric material to form a rib over said lead means, and cooling said dielectric material to lock said lead means within said coil.

References Cited by the Examiner

UNITED STATES PATENTS

| 2,224,288 | 12/1940 | Chapman | 317—261 |
| 2,940,161 | 6/1960 | Elarde | 317—258 |
| 3,040,415 | 6/1962 | Rayburn | 317—260 |

FOREIGN PATENTS

| 235,769 | 6/1925 | Great Britain. |
| 439,064 | 11/1935 | Great Britain. |

ROBERT K. SCHAEFER, *Primary Examiner.*

E. GOLDBERG, *Assistant Examiner.*